United States Patent [19]

Klose

[11] Patent Number: 4,900,382

[45] Date of Patent: Feb. 13, 1990

[54] METHOD FOR MONITORING APPLICATION OF TREAD STOCK TO A TIRE CARCASS

[75] Inventor: Karl W. Klose, Findlay, Ohio

[73] Assignee: Cooper Tire & Rubber Company, Findlay, Ohio

[21] Appl. No.: 241,519

[22] Filed: Sep. 7, 1988

Related U.S. Application Data

[62] Division of Ser. No. 911,595, Sep. 25, 1986, abandoned.

[51] Int. Cl.[4] .............................................. B29D 30/58
[52] U.S. Cl. .................................... 156/128.6; 156/64
[58] Field of Search ............... 156/411, 413, 414, 421, 156/130.3, 129, 128.1, 96, 378, 128.6, 64, 379

[56] References Cited

U.S. PATENT DOCUMENTS

| | | | |
|---|---|---|---|
| 3,923,390 | 12/1975 | Susko | 353/95 |
| 3,944,458 | 3/1976 | Branick | 156/413 |
| 4,106,965 | 8/1978 | Lee | 156/123 |
| 4,276,105 | 6/1981 | Gessaga | 156/128.1 |
| 4,402,782 | 9/1983 | Klose et al. | 156/414 |

Primary Examiner—Raymond Hoch

Attorney, Agent, or Firm—Biebel, French & Nauman

[57] ABSTRACT

A method is provided for monitoring proper application of a length of tread stock to the periphery of a green tire carcass. The tread stock has an outer face with a centering mark defined along the length of the outer face. The stock is affixed to the green tire carcass in a supposed centered position to form an assembled green tire, and the assembled green tire is supported for rotation. A wheel having a pair of annular ridges or grooves on its peripheral surface is positioned in contact with the green tire, and the green tire and wheel are mutually counterrotated. The ridges or grooves are positioned on the wheel spaced equidistantly from the centerline of the green tire, so that counterrotation of the green tire and wheel cause the ridges or grooves to impress alignment marks into the tread stock on each side of the central groove. The spacing between the alignment and centering marks provides a qualitative and quantitative appraisal of the positioning of the tread stock on the green tire carcass, and when such alignment variations exceed specifications, the variation is readily ascertainable and the subject green tire may be rejected.

15 Claims, 4 Drawing Sheets

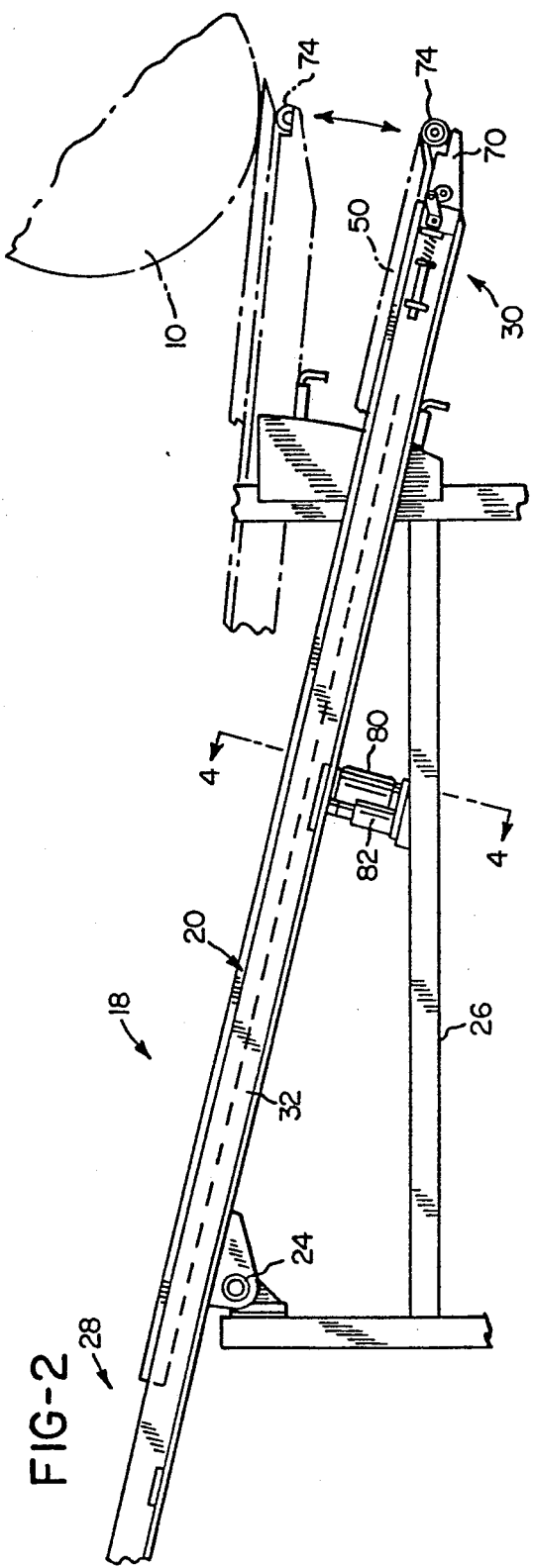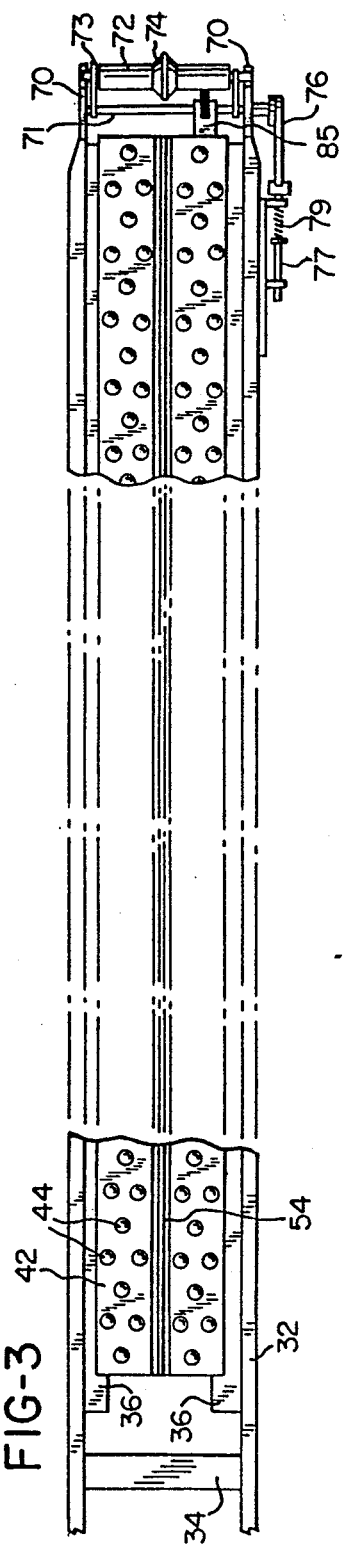

METHOD FOR MONITORING APPLICATION OF TREAD STOCK TO A TIRE CARCASS

This is a divisional application of Ser. No. 911,595 filed Sept. 25, 1986, now abandoned.

BACKGROUND OF THE INVENTION

The present invention relates generally to the manufacture of rubber tires for wheeled vehicles. More particularly, the present invention relates to the applying of a separately formed strip of tread stock to a tire carcass, followed by monitoring of the precision of its application.

In manufacturing tires, the assembly of tire elements is generally completed when a separately formed strip of band of tread stock is attached to a green tire carcass, the tread stock being applied either individually or as a sub-assembly consisting of the belts and the tread stock. The tread stock is typically produced by extruding a continuous strip or band of uncured rubber, the extrusion having a cross-sectional shape that is generally hat-like, in that it includes a relatively massive central portion with thin extremities extending outwardly on either side at the lowermost edge of the stock. The strip or band is cut to suitable lengths for subsequent assembly on a green tire carcass or belt package.

Applying the tread stock to the tire carcass in other than a precisely centered manner results in a non-uniform displacement of rubber during the shaping stage of the curing process. The situation can result in a non-uniform tire. For example, consider a radial ply carcass on which the belts had been properly aligned and assembled. Next, assume that the tread stock is inadvertently applied either off center or in a crooked or wobbly manner. During the shaping or curing process, the mold will force the tread stock material into the proper configuration. This unsymmetric or non-uniform lateral displacement of tread stock material may, during the shaping or curing process, result in a similar but opposite lateral displacement of one or more of the underlying belts. In addition to such lateral displacement of the underlying belts, such off-center or crooked tread stock may also result in uneven distribution of the tread stock on the cured tire structure, causing an undesirable deformation of the underlying tire structure elements and also causing a serious, uncorrectable lateral balance problem. The presence of such conditions in the finished, cured tire could adversely affect the tire's operating characteristics, and upon detection at final inspection, such tires are discarded.

To assist the machine operator in the orientation of the tread stock, a number of complex reference guide means have been developed. For example, U.S. Pat. No. 3,923,390, issued Dec. 2, 1975 to Susko, projects reference lines of light onto the surface of the belt and tread stock package being assembled. The projected lines are generally positioned to coincide with the rounded shoulder areas of the tread stock extrusion. A second example is disclosed in U.S. Pat. No. 3,026,230, issued Mar. 20, 1962 to Nebout.

Following positioning of the tread stock on the tire carcass, the assembled green tire is consolidated by a process called stitching. Stitching is performed by rolling rigid stitcher wheels over the surface of the tire assembly to bring the tacky surfaces of the tread stock and tire carcass into intimate contact and to work out any entrained air.

Even when the tread stock material has been properly positioned on the tire carcass, its position does not become substantially fixed until completion of the stitching operation. Thus, there is also the possibility that properly positioned tread stock can become displaced between application and stitching. For example, in the case of a two-stage radial tire assembly process, the tacky tread material may partially stick to the building drum apparatus or the transfer apparatus. Either event can pull the tread stock and underlying belts out of alignment and, of course, subsequent stitching fixes these portions in such misaligned positions.

In the event that any of the aforementioned problems occur, their discovery prior to the curing process is preferable over discovery after the curing process, at final inspection. Before curing takes place, the tire is held together due primarily to the tacky nature of the materials used, and at that stage misaligned tread and/or belts may be physically removed from the tire carcass by peeling them away by hand. Should such a defect be discovered and so remedied, the basic carcass may be so salvaged by replacement of the misaligned tread and/or belts. A significant cost savings is therefore realized, and the problem of disposing of defective tires is reduced.

What is needed, therefore, is means for easily and reliably detecting improper placement of the tread stock prior to curing of the assembled tire. This means should not, add to the operation necessary to assemble, stitch or cure the tire.

SUMMARY OF THE INVENTION

In meeting the foregoing needs, the present invention provides an apparatus for monitoring the accuracy of the application of a length of tread stick to a green tire carcass once the tread stock has been positioned and consolidated with on the green tire carcass in a supposed centered position to form an assembled green tire. The tread stock is formed prior to its application by extrusion, and includes a centering mark in the form of a groove or ridge defined along its outer surface. The centering mark is preferably formed along the tread stock centerline.

Means is provided for supporting the assembled green tire for rotation about a first axis. A drive means rotates the assembled green tire and the supporting means. A rigid wheel having a peripheral surface is mounted for rotation about a second axis parallel to the first axis. Means also positions the rigid wheel with its peripheral surface in contact with the green tire so that the green tire and wheel mutually counterrotate.

At least one annular ridge or depression is defined about the peripheral surface of said wheel, the ridge or depression being positioned on the surface with a predetermined spaced relationship from the theoretical location of the centering mark on the green tire. Counterrotation of the green tire and rigid wheel therefore causes the ridge or depression to impress an alignment mark onto the uncured tread stock on the green tire, the spacing between the central groove and the alignment groove providing an indication of the positioning of the tread stock on the green tire carcass.

Preferably, two of the annular ridges or depressions are defined about the peripheral surface of the rigid wheel, the ridges or depressions being positioned on the surface of the rigid wheel to impress two of the alignment marks into the green tire, the two ridges or depressions being positioned equidistantly in opposite directions from the centerline of the green tire.

The drive means may be connected to the rigid wheel for driving thereof, contact between the rigid wheel and the green tire causing rotation of the green tire. The peripheral surface of the rigid wheel may also be adapted to perform a stitching operation upon the green tire simultaneous with impressing of the marks. In such a case, the apparatus forms a part of a tire stitching machine.

The placement of alignment marks, instead of being formed by impressing grooves or ridges into the surface of the tread stock, may be formed by directing a marking fluid, such as paint or ink, onto the tread stock surface. In such a case, the paint line or ink lines serve a monitoring function in a manner identical to the impressed grooves or ridges.

The method of monitoring the proper application of the tread stock to the periphery of the green tire carcass may include simply supporting the assembled green tire, and impressing an alignment mark into the tread stock on the green tire with a predetermined and fixed spaced relationship from the centerline of the green tire. The spacing between the central mark and the alignment groove thus provides an indication of the positioning of the tread stock on the green tire carcass.

Again, paint or ink lines may be used in place of impressed ridges or grooves.

Alternatively, the supported green tire may be rotated about an axis, with the impressing of the alignment mark being performed by providing a rigid wheel having a peripheral surface and at least one annular ridge or depression defined about the peripheral surface of the rigid wheel. The rigid wheel is positioned with its peripheral surface in contact with the green tire, and with the ridge or depression being positioned on the green tire with the predetermined and fixed space relationship from the centerline of the green tire. The wheel is counterrotated with respect to the green tire, and the alignment groove is impressed by the ridge or depression.

The method may include simultaneously impressing a second of the alignment marks into the green tire, the marks being impressed into the green tire to be positioned equidistantly in opposite directions from the theoretical location of the centering mark on the tread stock.

Accordingly, it is an object of the invention to provide a method and apparatus for monitoring the proper placement of a length of tread stock onto the surface of a green tire carcass; to provide such a method and apparatus which can perform such monitoring during performance of some other operation upon the assembled green tire; to provide such a method and apparatus that performs monitoring; to provide such a method and apparatus that requires no significant additional apparatus for the green tire building machine; and to provide such a method and apparatus that provides an indication that can be detected in a variety of manners.

Other objects and advantages of the present invention will be apparent from the following description, the accompanying drawings, and the appended claims.

BRIEF DESCRIPTION OF THE DRAWINGS

FIG. 2 is a side view of a tread stock servicer used with the method and forming a portion of the apparatus;

FIG. 3 is a plan view of the servicer of FIG. 2;

DETAILED DESCRIPTION OF THE PREFERRED EMBODIMENTS

Figure 1:
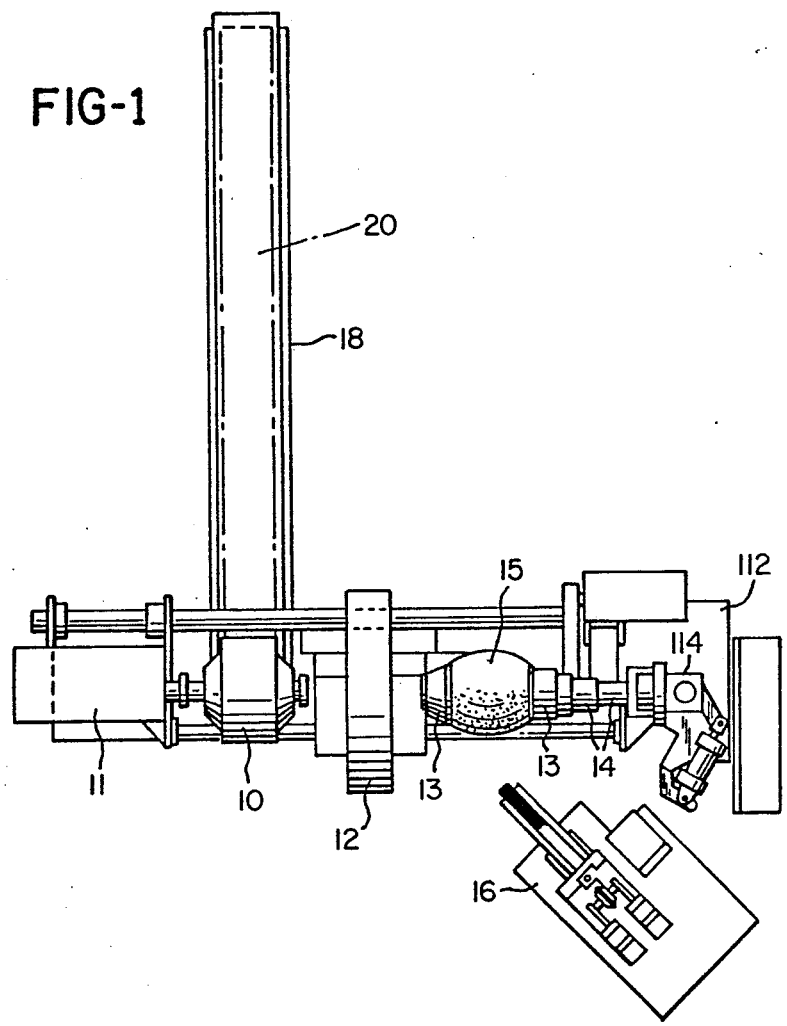
FIG. 1 is a plan view of a tire building machine with which the method and apparatus of the present invention may be used.

Referring now to FIG. 1, a second stage tire building machine is shown that incorporates the apparatus for monitoring the application of tread stock to a green tire carcass in accordance with the present invention.

The tire building machine includes a radially expansible and collapsible building drum 10 upon which a belt and tread stock package is assembled. Specific details regarding an appropriate drum 10 may be seen by reference to U.S. Pat. No. 4,445,963, issued May 1, 1984 to Klose et al. Conventional belt material is supplied from a servicing apparatus (not shown but situated coincidental and above tread servicer 18) and positioned upon the drum 10. The tread stock is then applied and positioned onto the belts previously applied to drum 10. The building drum 10 is provided with a rotary drive means 11 connected thereto, so that drum 10 may be rotated about its horizontal axis during application of both the belt material and the tread stock.

In the event a tire is manufactured that does not include belt material, the tread stock may be applied directly to the green tire carcass. The present invention is equally usable in such a case.

A transfer ring 12 transfers the assembled belt and tread stock package from building drum 10 to a final assembly portion of the machine for final assembly to a first stage tire carcass and stitching. Transfer ring 12 is configured to contract radially about the belt and tread stock package in order to transfer the package axially from building drum 10 to the final assembly portion. Details of an appropriate construction for ring 12 may be seen by reference to U.S. Pat. No. 4,469,546, issued Sept. 4, 1984 to Klose.

The final assembly portion includes a pair of disc members 13 mounted upon the common ends of a pair of coaxial shafts 14. While not shown in the drawings, shafts 14 have a threaded rod positioned therein with nuts mounted on the rod for moving the shafts 14 and disc members 13 toward and away from one another.

The green tire assembly is positioned on disc members 13. Disc members 13 are moved apart to enable the disc members to engage an annular bead previously formed on each end of the green tire carcass. The green tire carcass is inflated which draws the bead area into sealing engagement with disc members 13, while at the same time giving the green tire assembly a partial toroidal shape illustrated by green tire assembly 15 in FIG. 1. Further details regarding the operation of disc members 13 may be seen by reference to U.S. Pat. No. 4,402,782, issued Sept. 6, 1983 to Klose et al.

Transfer ring 12 moves the belt and tread stock package from drum 10 to position the package over green tire carcass 15. The green tire carcass is inflated to expand the carcass into engagement with the belt and tread stock package. Transfer ring 12 is then collapsed radially outward to release the belt and tread stock package.

After transfer ring 12 has been collapsed and moved laterally to its inactive position, a stitching mechanism 16 and the fully assembled green tire are brought into mutual engagement. "Stitching" is then performed by rolling rigid stitcher wheels over the surface of the green tire assembly to bring the tacky surfaces of the assembled green tire carcass elements into intimate contact and to work out any entrained air. After stitching, the green tire is removed from the disc members 13 and taken away from the building machine for further processing.

Building drum 10 has positioned adjacent thereto a tread stock servicer 18 in accordance with the present invention, the servicer including a conveyor means 20 for delivery of tread stock to the building drum 10. Servicer 18 aligns the tread stock material for placement onto the belts previously assembled on building drum 10.

One embodiment of tread stock servicer 18 may be seen in greater detail in FIG. 2. The servicer is connected by pivotal mount 24 to a supporting frame 26. Servicer 18 is positioned in an inclined orientation, having a raised upper loading end 28 and a lower delivery end 30. Delivery end 30 is positioned generally beneath the tire building drum 10 and any belts carried thereon.

Figure 4:
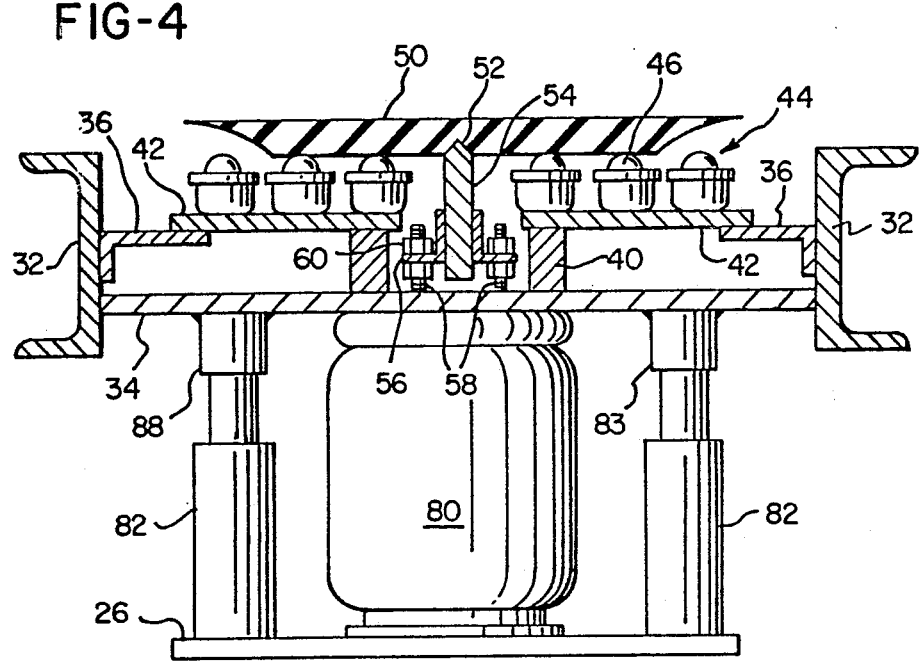
FIG. 4 is a sectional view of the servicer of FIG. 3, taken generally along line 4—4 of FIG. 2.

The servicer 18 is further illustrated in FIGS. 3 and 4. As is shown, servicer 18 includes a pair of parallel channel side members 32 extending the full length of the servicer. The side members are connected by a plurality of transverse braces 34, and an elongated bracket 36 extends inwardly from each of the side members. Further, supported on transverse braces 34 are inner supports 40 (see FIG. 4).

One bracket 36 and one support 40 together support one of a pair of elongated conveyor plates 42. Each conveyor plate 42 in turn defines a base for a plurality of ball rollers 44. As can be appreciated, each roller 44 constitutes a ball 46 held for rotation within a retainer cup 48. Balls 46 together cooperate to define a planar movement surface along which a length of tread stock 50 may be moved downwardly along servicer 18.

Other alternatives may be used to define the planar movement surface. For example, cylindrical rollers or driven conveyor belts may be provided to carry the stock toward the building drum. Further variations will be readily apparant to those skilled in the art.

In order to provide proper centering alignment for tread stock 50, a centering mark in the form of groove 52 is previously formed down the entire length of the outer face of the tread stock material, preferably at the same time that the stock is initially formed or extruded. The outer face, which will later have the tire tread pattern formed thereon, as well as groove 52, is positioned downwardly as the tread stock is located on servicer 18.

The center groove 52 may be replaced by any other appropriate mark, such as a ridge, which may be conveniently formed at the time the stock is extruded. Such a mark need not be centered on the tread stock, although such centering enables the tread to be positioned on the servicer 18 in either direction. It will further be recognized that the mark may be formed with a variety of cross-sectional shaped other than the V-shape illustrated by groove 52. For example, the mark could have a rectangular cross section similar to those shown in FIGS. 6 and 7.

An upright centering plate 54 is disposed between the conveyor plates 42 supporting ball rollers 44. Plate 54 is provided with a matching upper edge for cooperation with the groove 52 formed in the tread stock material. A pair of angle brackets 56 supported plate 54, with brackets 56 in turn being supported by threaded shafts 58 from braces 34. Nuts 60 secure brackets 56 at a distance above braces 34, and serve as an adjustment means for the extent to which plate 54 projects outwardly from the movement surface of the tread stock.

In the event a centering mark is located on the tread stock in other than a centered position, it will be recognized that plate 54 will be located correspondingly off-center along servicer 18.

Thus, the building machine operator, when loading a section of stock onto servicer 18, positions the stock with the upper, beveled end of plate 54 engaged with groove 52. This provides a clear indication to the operator that the stock is properly centered. As the tread stock moves downwardly along the conveyor of servicer 18, plate 54 remains engaged with groove 52, holding the stock in a precise and properly centered position.

As seen in FIGS. 2 and 3, a delivery end bracket 70 extends from the lower end of each side member 32 of servicer 18. A shaft 71 is mounted for rotation between brackets 70 and supports a pair of arms 73 which in turn rotatably support a guide roller 72. Roller 72 includes an annular central ridge 74 that is sized to cooperate with the groove 52 formed on the outer face of the tread stock. Ridge 74 is aligned with plate 54 extending along the length of the servicer 18.

Figure 2A:
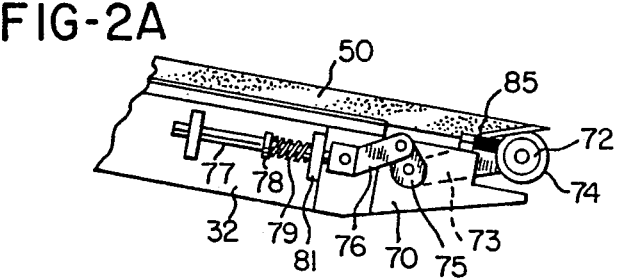
FIG. 2A is a view showing an enlarged portion of the servicer shown in FIG. 2, illustrating the guide roller and stop mechanism located at the delivery end of the servicer.

Referring now to FIG. 2A, shaft 71 additionally supports a crank wheel 75 to which a crank lever 76 is pivotally attached. Lever 76 is then pivotally connected to rod 77 slidably mounted with respect to one side member 32 of servicer 18. A collar 78 attached to rod 77 retains a spring 79 between collar 78 and mounting plate 81. Spring 79 urges rod 77 away from the delivery end of the servicer, causing lever 76 to rotate wheel 75 and rod 71. This in turn raises roller 72 supported by brackets 73.

Raising of roller 72 as described brings roller 72 into contact with a stop member 85 fixed to servicer 18. (See also FIG. 3) Stop member 18 is fitted with a resilient tip which, when in contact with roller 72, prevents any rotation of roller 72.

Referring now to FIGS. 2 and 4, a lift mechanism is provided for raising the delivery end of tread stock servicer 18. As best seen in FIG. 4, the lift mechanism includes an air cylinder 80 connected between frame 26 and one transverse brace 34 of servicer 18. A pair of guides 82 are also provided, each secured to both frame 26 and brace 34. As air pressure within cylinder 80 is reduced, the weight of servicer 18 causes the servicer to pivotally lower about mounting 24, guides 82 ensuring that motion of the frame is vertical without unwanted side-to-side movement. A raised collar 83 on each guide 82 acts as a stop for downward motion, with such motion halting once the collar 83 contacts the lower portion of guide 82.

In operation, the tread stock servicer is initially placed in its lowered position, shown in FIG. 2. Tread stock is positioned on the servicer and is centered by positioning the center groove 52 on the guide member 54. The tread stock then moves by gravity over ball rollers 44, until the leading edge of the tread stock comes to rest against guide roller 72. Roller 72 is at this time raised at least partially into the path of the tread stock and prevented from rotation by stop member 85. Thus, the leading edge of the stock will abut the roller 72 with annular ridge 74 registering with the center groove on the stock, thereby halting the stock and maintaining it in a centered position.

An operator next directs air under pressure to cylinder 80 through the actuation of a suitable control, which causes the servicer to pivot about connection 24 to elevate servicer 18. When moved to its raised or operating position, shown in broken lines in FIG. 2, servicer 18 holds the leading edge of the stock against a belt package previously assembled on building drum 10. Because the inner, uppermost surface of the tread stock is formed from material which is tacky or of an adhesive nature, it will adhere to the surface of the belts placed on drum 10 when engaged therewith.

As the leading edge of the tread stock is pressed into contact with the tacky surface of the belt package, roller 72 is forced downwardly by rotation of support arms 73 and shaft 71. This moves roller 72 away from stop member 85, thereby releasing roller 72 for rotation. (At the same time, rotation of shaft 71 causes rod 77 to be drawn toward the delivery end of the servicer, whereupon collar 78 and mounting plate 81 cooperate to compress spring 79. Thus, when the servicer is subsequently lowered, spring 79 will urge roller 72 back into contact with stop member 85.)

Building drum 10 is next caused to rotate slowly in a counterclockwise direction (with respect to FIG. 2). Rotation of the drum thus draws the tread stock off the servicer and onto the drum. Raised ridge 74 of roller 72 extends slightly above the height of centering plate 54 or wheels 66, so that the stock is slightly raised as it passes over roller 72. The upward movement imparted to the leading edge of the tread stock by engagement of the ridge 74 on guide roller 72 with the stock tends to adhere the leading portion of the stock on the belts (or green tire carcass) carried on the drum. During the withdrawal of tread stock from the delivery end of the servicer, ridge 74 will continue to move along the center groove in the tread stock, thereby ensuring the proper positioning and alignment on the drum.

It will be noticed that the arrangement for servicer 18 disclosed herein results in the tread stock being fully supported immediately beneath the point at which the stock is placed onto the belt package carried on the building drum 10. This is important, since such support enables the stock to be positioned in a centered fashion with significantly greater control and, hence, precision.

After the stock has been properly positioned on the belt package and the end splice of the tread stock has been secured, the belt and tread stock package is moved by the transfer ring 12 shown in FIG. 1 from drum 10 and toward the disc members 12. Prior to such movement, disc members 13 are first moved into close relationship to accomodate the placing of a previously assembled green tire carcass thereon, following which placement the disc members 13 are moved apart into engagement with the bead ring portions of said green tire carcass. With the bead ring portions engaged with the disc members 13, air is introduced into the spaced defined by the green tire carcass and disc members 13 while the disc members are made to approach one another, thereby causing the green tire carcass to assume a partially toroidal shape.

Transfer ring 12 moves the belt and tread stock package over the partially inflated green tire carcass, halting with the belt and tread stock package properly positioned for placement onto the green tire carcass. The green tire carcass is then further inflated, during which time disc members 13 are moved together additionally to cause the green tire to expand into a more toroidal shape. The expansion causes the outer circumferential surface of the green tire carcass to engage the inner surface of the belt and tread stock package. Transfer ring 12 is then collapsed radially outward and returns laterally to its inactive position. The stitching operation is then performed using stitcher mechanism 16.

Figure 5:
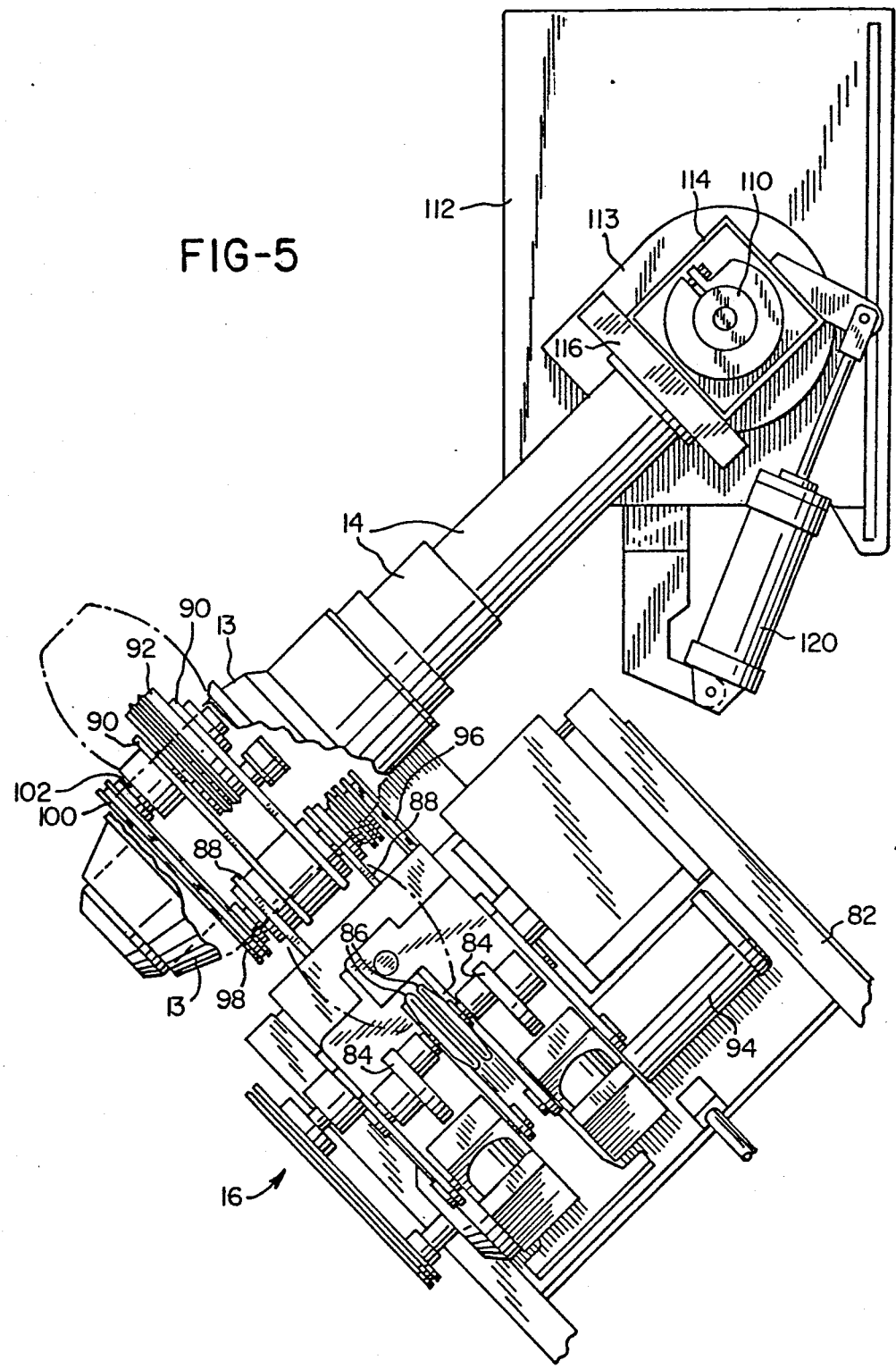
FIG. 5 is an enlarged portion of a stitcher mechanism forming a portion of the apparatus of FIG. 1.

Referring to FIG. 5, stitcher mechanism 16 is shown in detail, and includes a base 82 which supports a pair of upwardly extending arms 84. Each arm in turn carries one of a pair of conventional stitcher wheels 86 which are manipulated by arms 84 in a conventional manner. Once stitching of the central portion of the green tire has been completed, as will be described, arms 84 move wheels 86 into contact with the assembled green tire for stitching of the outer portions of the green tire. Further details regarding the operation of this portion of stitcher mechanism 16, which is conventional, may be found by reference to U.S. Pat. No. 4,306,931, issued Dec. 22, 1981 to Klose, and which is hereby incorporated by reference.

The forward end of stitcher frame 82 supports a pair of forwardly extending parallel arms 88 which function as supports for a second pair of parallel arms 90. Mounted at the forwardmost ends of arms 90 is a stitcher/drive wheel 92. A drive motor 94 located near the rear of base 82 and a cooperating drive belt 96 connect with a pulley mounted onto a shaft 98 extending through the pivotal connection between arms 88 and 90. A second drive belt 100 connects shaft 98 with a shaft 102 supporting stitcher/drive wheel 92. Thus, wheel 92 is driven for rotation by motor 94.

In operation, stitcher/wheel 92 is initially positioned below and brought upwardly into contact with the surface of an assembled green tire. To accomplish this, arms 90 supporting wheel 92 are provided with suitable means including a selectively engageable clutch for rotating the arms to enable wheel 92 to contact tires of various diameters.

Referring briefly back to FIG. 1, it can be seen that disc members 13 initially receive a green tire in a position which does not permit the engaging of the green tire by the stitcher mechanism 16. However, disc members 13 are shown in FIG. 5 properly positioned for the stitching operation. To accomplish this, an upright post 110 is mounted to a base 112 which is fixed with respect to the overall building mechanism frame. A pivot plate 113 and a hollow column 114 extending upwardly therefrom are placed onto post 110 for rotation about the post. A mounting plate 116 is attached to column 114 and supports concentric shafts 14.

A cylinder and piston 120 are connected between column 114 and frame 112 for pivotal movement of column 114 around post 110. Cylinder and piston 120 are selected to provide proper amount of movement for column 114 to move the assembled green tire from the position shown in FIG. 1 to that shown in FIG. 5.

Upon placement of a green tire carcass 15 onto disc members 13, assembly of the belt and tread stock package thereonto, and movement of the assembled green tire to the position shown in FIG. 5, arms 90 of stitcher mechanism 16 are pivotally raised to bring stitcher/drive wheel 92 into contact with the assembled green tire. Drive motor 94 then causes stitcher/drive wheel 92 to rotate, which in turn rotates the assembled green tire, along with the disc members 13 about the shafts 14. Thus, it can be seen that wheel 92 functions both as a stitcher wheel and as a drive wheel for the assembled green tire.

Upon completion of the stitching in the center of medium portion of the green tire by the stitcher drive wheel, the two conventional stitcher wheels 86 are brought into engagement with the green tire which is still rotatably driven by the stitcher/drive wheel 92. Wheels 86 are moved gradually outwardly by arms 84 along the green tire contoured surface during the stitching operation to complete the stitching of the entire green tire.

Figure 6:
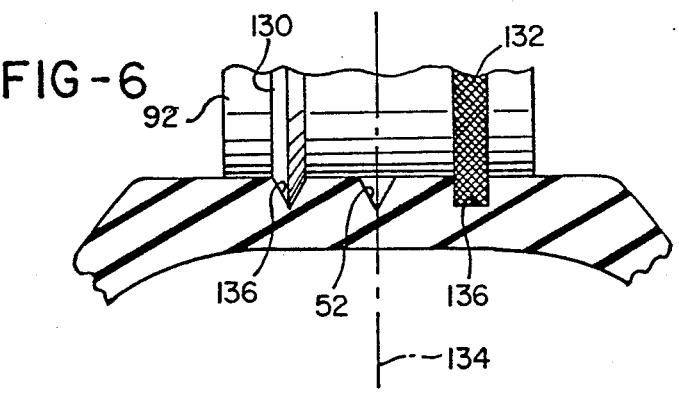
FIG. 6 is a further enlarged portion of a stitcher wheel of the apparatus of FIG. 5, shown operating upon a portion of a green tire.

An enlarged view of stitcher/drive wheel 92 while in contact with an assembled green tire 15 is shown in FIG. 6. It should be noted that the surface of stitcher/drive wheel 92 is provided with a pair of alternative design annular ridges 130 and 132, each of which is spaced equidistantly from the centerline 134 of the green tire supported by disc members 13. Ridge 130 is shown as a peaked ridge having a triangular cross section, while ridge 132 has a rectangular cross section and a flat, knurled or otherwise roughened outer surface. Either alternative may be used and is regarded as preferred, although other configurations for the ridge may be usable. Further, it will be recognized that ordinarily, contrary to what is actually shown in FIG. 6, only a single type of ridge will generally be used for both ridges on a single stitcher/drive wheel 92. However, it may be desirable in some cases to provide two different configurations for the ridges, for example, where a record is needed of the direction in which the green tire was mounted to disc members 13 for stitching.

During stitching of the central portion of the green tire with stitcher/drive wheel 92, ridges 130 and 132 will form annular alignment marks or grooves 136 into the tread stock. These grooves 136 will be similar to the central groove 52 already formed into the tread stock prior to its positioning on the green tire.

Since a properly assembled green tire will have the tread stock centered on the green tire carcass, groove 52 after stitching should lie directly along the tire centerline 134. Further, since grooves 136 are cut with equal spacing away from the theoretical tire centerline, grooves 136 should be equally spaced from groove 52 along the entire circumference of the green tire.

Thus, following the stitching operation, a clear indication is presented as to whether the green tire has been properly assembled. Three grooves, equally spaced, should be formed around the entire circumference of the green tire. Any variation in the spacing between center groove 52 and outer groove 136 will indicate that the tread stock has been improperly applied or displaced during the final assembly or consolidated process and, as a consequent, the underlying belts may have also been displaced.

Figure 7:
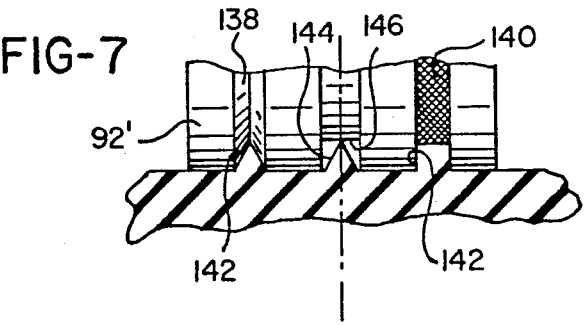
FIG. 7 is a view similar to FIG. 6, showing an alternate embodiment for the stitcher wheel.

It will be recognized that a variety of further alternatives to those shown in FIG. 6 are available for ridges 130 and 132. For example, as shown in FIG. 7, a stitcher/drive wheel 92' may include grooves 138 and 140 rather than ridges. In such a case, the movement of stitcher/drive wheel 92' over the surface of the assembled green tire 15 causes the material of the tread stock to be forced into the grooves 138 and 140 to form alignment marks appearing as ridges 142 in the stitched tire. As with the ridges 130 and 132 shown in FIG. 6, grooves 138 and 140 illustrate two embodiments for the grooves, groove 138 having a V-shaped cross section and groove 140 having a rectangular cross section. Various other cross sections can be used.

FIG. 7 also illustrates an assembled green tire wherein the centering mark formed into the tread stock prior to its assembly onto the green tire carcass is a ridge 144 rather than a groove. In such a case, the stitcher/drive wheel 92' may require a recessed portion 146 along its central portion to avoid obliterating the centering ridge 144 during stitching.

The relative positions of the alignment marks, whether grooves or marks, can be readily monitored by a variety of available methods. For example, the machine operator may visually scan the marks. Variations in the three-mark pattern will be easily observable. An optical follower could be provided using light beams to track the marks, or in the case of grooves, a mechanical follower could be inserted into the grooves as the green tire is rotated. Other alternatives will be readily apparent to those skilled in the art.

It should be recognized that it is not necessary that grooves 136 or ridges 142 be defined by a wheel also functioning as a stitcher wheel or as a drive wheel. A mark-forming wheel or scribing means could be mounted in a separate machine for forming the marks, or a separate mark forming wheel could be included in the stitcher apparatus. Of course, combining a mark forming wheel into a combined drive and stitcher wheel is regarded as preferred as making most efficient use of the tire building apparatus.

It is also necessary that marks in the form of ridges or even grooves be formed using a wheel. A fixed member could be positioned near the mounted green tire and moved into contact with the green tire surface as the tire is rotated. Ridges, grooves or other alignment marks could thus be scribed into the surface of the tire.

The alignment marks described herein can also be formed in a manner which simply marks the tire surface without displacing any of the rubber material of the tire. For example, small spray nozzles could be located near the green tire surface during rotation of the tire. Paint is then delivered to the nozzles to place a relatively thin line of paint around the tire periphery. The painted alignment marks may then be read in the same manner as in the case of grooves or ridges. Of course, marking substances other than paint, such as inks, may also be used. These marks will either be obliterated during the molding and curing process, or will wear off shortly after the finished tire has been placed into use. Where no evidence of the alignment marks is desired, special paints or inks visible only under ultraviolet illumination can be used, with an appropriate lamp mounted near the stitcher machine or whereever analysis of the tire alignment is to be carried out.

Paint, ink or other marking substances may, of course, also be used for the central mark formed on the tread stock and with which the alignment marks are to be compared. A spray nozzle can be mounted near the extruding machine used to form the tread stock to provide the centering mark.

It should also be recognized that it is not necessary to provide two alignment marks along the surface of the assembled green tire. A single mark could be formed, with the spacing of such a mark from the center groove 52 providing an indication of the accuracy of the positioning of the tread stock on the green tire carcass. In such a case, however, it becomes necessary to actually measure the spacing between the mark and the center groove, since deviations will be less readily apparent in visual observation, which may result in less efficient monitoring of the assembled green tire. It may also be desirable in some cases to provide more than two alignment marks.

It is also not necessary that the stitcher wheel with grooves or ridges and the tread servicer apparatus as described herein be used together in the same tire building machine. Either may be used independently, although the same central groove or ridge previously formed or applied into the tread stock and used in centering the tread stock on the servicer may be used as the centering mark for monitoring the proper application of the tread.

After the stitching operation is performed to firmly secure the parts of the assembled green tire, tires approved in accordance with this invention are removed from the building processing. Tires not approved in accordance with this invention may be repaired or rejected, thus eliminating the cost and effort of curing a defective tire only to scrap some after the curing process.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of monitoring the alignment of a length of tread stock applied to the periphery of an annular green tire carcass to form a green tire assembly, the tread stock having sufficient length to permit the opposite ends to be spliced so as to define an exposed outer face and an inner face, wherein the inner face defines an inner circumference, the green tire carcass having an outer circumference substantially equal to the inner circumference of the tread stock to engage the inner face of the tread stock, the outer face of the tread stock including a centering mark defined along the length of the tread stock, said method comprising the steps of:
   supporting and rotating the green tire assembly while forming an alignment mark about the entire circumference of the outer face of the tread stock;
   wherein the alignment mark is in axially spaced relationship to the centering mark already thereon, whereby spacing between the centering mark and the alignment mark provides an indication of the positioning and accurate circumferential alignment of the tread stock on the green tire carcass.

2. A method of checking for proper alignment in application of a tread stock and belt package to the periphery of a green tire carcass, the tread stock having an outer face with a centering mark defined along the length of the package, comprising the steps of:
   (a) applying the package around the green tire carcass to form an assembled green tire with the outer face of the tread stock exposed to make visible the centering mark on the periphery of the green tire;
   (b) supporting the assembled green tire for rotation about an axis extending through its center;
   (c) rotating the assembled green tire;
   (d) placing an alignment mark on the outer face of the tread stock on the rotating green tire at a predetermined axially spaced location from the centering mark already thereon,
   whereby variation in the spacing between the centering mark and the alignment mark provides an indication of incorrect positioning of the tread stock and belt package on the green tire carcass.

3. A method as defined in claim 2, wherein the placing of the alignment mark is performed by positioning a marking means with respect to the supported green tire in a predetermined spaced relationship from the center of the belt and tread stock package, and by further positioning the marking means adjacent the outer face of the tread stock, whereby rotation of the green tire causes the marking means to place the annular alignment mark along the tread stock on the green tire spaced from the centering mark.

4. A method as defined in claim 3, wherein said placing of said alignment mark further includes impressing said alignment mark into the surface of the green tire with said marking means by positioning said marking means in contact with the green tire during rotation of the tire.

5. The method as defined in claim 4, wherein said impressing of said alignment mark includes the steps of:
   providing a rigid wheel having a peripheral surface and at least one annular impressing means defined about said peripheral surface of said wheel;
   positioning said wheel with said peripheral surface in contact with the green tire, and with said impressing means being positioned on the green tire with said predetermined and fixed spaced relationship from the centerline of the green tire;
   counterrotating said wheel with respect to the green tire; and
   impressing said alignment mark with said impressing means.

6. A method as defined in claim 5, wherein said impressing means includes an annular ridge, and said impressing of said alignment mark is performed by pressing said ridge into the tire to form said alignment mark as an alignment groove.

7. A method as defined in claim 5, wherein said impressing means includes an annular groove, and said impressing of said alignment mark is performed by pressing said groove into the tire to form said alignment mark as an alignment ridge.

8. A method as defined in claim 4, wherein said impressing of said alignment mark includes the steps of:
   providing a means for defining a scribing edge;
   positioning said scribing edge in contact with the green tire with a predetermined spaced relationship from the centerline of the green tire, whereby rotation of the green tire causes said scribing edge to form said alignment mark into the tire.

9. A method as defined in claim 2, wherein said placing of said alignment mark includes depositing a marking fluid onto the surface of the green tire to form said alignment mark.

10. A method as defined in claim 9, wherein said depositing of said marking fluid includes positioning a spray nozzle near the surface of the green tire, and directing said marking fluid from said spray nozzle.

11. A method as defined in claim 2, comprising the further step of performing a stitching operation upon the green tire with said wheel simultaneously with forming of said mark.

12. A method as defined in claim 2, comprising the further step of simultaneously impressing a second of said alignment marks into the green tire, said mark being impressed into the green tire to be positioned equidistantly in opposite directions from the centerline of the green tire.

13. The method as defined in claim 5, comprising the further steps of:
   providing the rigid wheel with a second annular impressing means defined about the peripheral surface of the wheel and spaced from the first impressing means;
   further positioning the wheel with respect to the green tire with the first and second impressing means being positioned on the green tire equidistantly in opposite directions from the centerline of the green tire;
   whereupon two alignment marks are formed by the wheel.

14. A method as defined in claim 2, wherein said alignment mark is formed to be triangular in cross section.

15. A method as defined in claim 2, wherein said alignment mark is formed to be rectangular in cross section.

* * * * *